(12) United States Patent
Kappel et al.

(10) Patent No.: US 7,328,567 B2
(45) Date of Patent: Feb. 12, 2008

(54) WHEEL RAKE

(75) Inventors: James E. Kappel, Junction City, WI (US); Kenneth J. Peeters, Bear Creek, WI (US); Gary L. Wilke, Shawano, WI (US)

(73) Assignee: H & S Manufacturing Co., Inc., Marshfield, WI (US)

( * ) Notice: Subject to any disclaimer, the term of this patent is extended or adjusted under 35 U.S.C. 154(b) by 163 days.

(21) Appl. No.: 10/934,208

(22) Filed: Sep. 3, 2004

(65) Prior Publication Data

US 2005/0055995 A1    Mar. 17, 2005

Related U.S. Application Data

(60) Provisional application No. 60/503,423, filed on Sep. 16, 2003.

(51) Int. Cl.
*A01D 78/00* (2006.01)

(52) U.S. Cl. .............................. 56/378; 56/375; 56/384; 56/396

(58) Field of Classification Search ................. 56/362, 56/365–367, 370, 375–380, 384, 385, 396–398
See application file for complete search history.

(56) References Cited

U.S. PATENT DOCUMENTS

| | | | |
|---|---|---|---|
| 2,827,754 A | * | 3/1958 | Hill .............................. 56/377 |
| 2,922,269 A | * | 1/1960 | van der Lely et al. ........ 56/377 |
| 2,925,702 A | | 2/1960 | Plant |
| 2,982,081 A | | 5/1961 | Cooley |
| 2,994,179 A | * | 8/1961 | van der Lely et al. ........ 56/377 |
| 3,031,834 A | * | 5/1962 | van der Lely et al. ........ 56/366 |
| 3,038,291 A | * | 6/1962 | van der Lely et al. ........ 56/366 |
| 3,108,424 A | | 10/1963 | Van Der Lely et al. |
| 3,267,656 A | * | 8/1966 | van der Lely ................. 56/370 |
| 3,466,860 A | | 9/1969 | Winkel et al. |
| 3,977,166 A | | 8/1976 | Delgado Delgado |
| 4,214,428 A | | 7/1980 | Caraway |
| 4,231,218 A | | 11/1980 | Delgado |
| 4,753,063 A | | 6/1988 | Buck |
| 4,785,614 A | | 11/1988 | Schoenherr |
| 4,932,197 A | | 6/1990 | Allen |
| 4,947,631 A | | 8/1990 | Kuehn |
| 4,974,407 A | | 12/1990 | Rowe et al. |
| 4,977,734 A | | 12/1990 | Rowe et al. |
| 5,062,260 A | | 11/1991 | Tonutti |
| 5,065,570 A | | 11/1991 | Kuehn |
| 5,155,986 A | * | 10/1992 | Kelderman ................... 56/365 |
| 5,199,252 A | | 4/1993 | Peeters |
| 5,231,829 A | | 8/1993 | Tonutti |
| 5,263,306 A | | 11/1993 | Tonutti |
| 5,305,590 A | | 4/1994 | Peeters |
| 5,313,772 A | | 5/1994 | Tonutti |
| 5,493,853 A | | 2/1996 | Tonutti |
| 5,540,040 A | | 7/1996 | Peeters |
| 5,615,545 A | | 4/1997 | Menichetti |
| 5,685,135 A | | 11/1997 | Menichetti |
| 5,752,375 A | | 5/1998 | Tonutti |
| 5,899,055 A | | 5/1999 | Rowse et al. |
| 6,038,844 A | | 3/2000 | Peeters et al. |
| 6,405,517 B1 | | 6/2002 | Peeters et al. |

* cited by examiner

*Primary Examiner*—Thomas B. Will
*Assistant Examiner*—Alicia Torres
(74) *Attorney, Agent, or Firm*—Patterson, Thuente, Skaar & Christensen, P.A.

(57) ABSTRACT

A wheel rake including an adjustment mechanism for adjusting wheel beam angle for more aggressive or less aggressive raking action.

20 Claims, 10 Drawing Sheets

WHEEL RAKE

RELATED APPLICATION

The present application claims the benefit of U.S. Provisional Application No. 60/503,423 filed Sep. 16, 2003, which is incorporated herein in its entirety by reference.

FIELD OF THE INVENTION

The invention relates to towable agricultural implements and more particularly to wheel rakes useful to form windrows from cut forage.

BACKGROUND OF THE INVENTION

A primary goal in the harvesting of hay or forage is to dry the hay as soon as possible and then to remove it from direct exposure to sunlight. The hay must be dried before storage to avoid the problems of mold and spontaneous combustion. Exposing the cut hay to sunlight longer than is required to adequately dry it, however, can result in unacceptable loss of nutritive value of the hay due to deterioration of the protein level.

Typically, hay is harvested into approximately five-foot swaths along the ground, and is exposed to sunlight for the initial stage of the drying process. These swaths spread out the hay to maximize exposure to the sun and air to speed initial drying. The swaths of hay are then raked into narrow windrows to remove most of the hay from direct contact with the moist ground. The windrow enhances air circulation within the hay, thereby hastening the drying process. Raking hay into windrows also facilitates gathering of hay by providing rows of forage for a hay baler or other harvesting device to follow.

Many types of wheel rakes have existed for decades. Wheel rakes utilize angled, tined "pinwheels" that are propelled across the ground of a field of cut forage. Contact with the ground while traveling across the ground rotates the wheels and thereby rakes the hay in a desired direction. Of particular interest are V-rakes in which at least two banks of rake wheels are deployed in the shape of a V during operation. Generally, V-rakes employ an arm on each side of a frame to support the wheel rakes. Such V-rakes are used to rake forage into a windrow by raking the forage from the outer edges of the implement inward. V-rakes are preferably adjustable so that the width of the windrow produced is variable and the swath raked on each pass is optimal for the circumstances encountered. For optimal operation, it is preferable that the relative angle of the wheel banks and the width of their separation be independently adjustable.

Wheel rakes are subject to repeated structural stresses due to uneven ground and irregular distribution of forage material when propelled through fields of cut hay to form the hay into windrows. The assemblies supporting the rake wheels must have considerable strength in order to bear such stresses successfully. Welded assemblies are thus preferred for their robustness and durability.

Wheel rakes convert the forward motion of the rake into a lifting and sideward motion by interaction of the rake wheels with the ground as the wheel rake is drawn forward. Compacted, damp or unusually heavy forage can create problems in that the rake wheels may tend to roll over or skip over areas of heavy compacted forage rather than lifting it and raking it toward the desired windrow. If this occurs, loss of production and increased costs result. Loss of production occurs if forage is left in the fields to decay rather than being harvested. Increased costs can occur if it is necessary to pass through the fields several times to accomplish sufficient raking to gather all of the forage desired. Thus, the efficiency of a wheel rake for lifting and moving forage can have a significant economic effect on hay farming.

Rake wheels include a plurality of tines extending from the rim of the wheel. Flexible metal tines lift and move forage to one side as the rake wheels rotate.

Traditionally, and sometimes today, tines extend the entire distance from the rake wheel hub beyond the rim. More commonly tines are attached to the wheel rim and the rim to the hub via spokes or a wheel disk. In the event that spokes are utilized, the spokes are often covered by a plastic disc. This arrangement keeps forage from passing through the wheel instead of being raked as desired.

Modern rake wheels often utilize metal tines mounted in flexible rubber bases. The rubber bases secure the tines to the wheel rim and provide a measure of controlled flexibility so that the tine can flex in response to loads in all directions without bending or breaking.

Wheel rakes are typically constructed so that multiple rake wheels are mounted side by side mounted on long beams. It is desirable that the beams be adjustable in width or separation and in the angle that the beams make with the path of travel as viewed from above. Prior wheel rakes have not allowed any adjustment of vertical raking angle.

The angle at which rake wheels contact the ground during the raking operation affects the ability of the wheel tines to lift and move forage. A more aggressive raking angle is one where the plane of the rake wheels is angled somewhat from the vertical. A less aggressive raking angle keeps the plane of the rake wheels close to vertical relative to the ground. At some times, when forage is heavy or compacted a more aggressive raking angle is desirable. At other times, conditions are such that forage left in the fields is light and not compacted. At these times, it would be valuable to be able to harvest forage with a less aggressive raking angle to minimize wear on wheel rake components.

A more aggressive raking angle allows the tines or fingers of the rake wheels to "dig in" better. That is, the tines reach under the forage to a greater degree. This greater reaching under tends to provide better lift and application of sideward force to the forage to improve the raking of heavy or compacted forage.

Thus, it would be a benefit to the agricultural arts to have access to a hay rake that allows for adjustment of raking angle to allow for ready adjustment from a less aggressive raking angle to a more aggressive raking angle.

SUMMARY OF THE INVENTION

The wheel rake of the present invention solves many of the above problems by providing a robust and easily adjustable mechanism that allows for the adjustment of the raking angle of the wheel rake. The present invention allows the operator to adjust raking angle relative to the ground easily with basic tools. The invention allows an operator to adjust the raking angle to be more aggressive when it is necessary to provide for the raking of heavy or compacted forage. Likewise, the invention allows an operator to return the raking angle to a less aggressive setting easily and quickly. The angle adjustment of the present invention is robust and sturdy to stand up to the high stresses inherent in the use of wheel rakes over the uneven ground in cultivated fields.

The wheel rake of the present invention generally includes a carriage and two rake assemblies. The rake assemblies are generally mirror images of one another and each include a beam supporting a plurality of rake wheels. The beams are adjustable in many ways. The beams are adjustable to provide different raking angles relative to the path of travel of the wheel rake as viewed from above. The beams are supported near their centers on a vertical shaft that allows for angling the beams about a vertical axis to change the angle relative to the forward motion of the wheel rake.

The beams are supported by a central carriage that can be adjusted to change the separation between the rake assemblies by telescopically widening or narrowing the carriage.

The beams are adjustable about a horizontal axis generally parallel to the long axis of the beam to adjust the aggressiveness of the raking angle. The beams are hingedly attached to the vertical shaft so that the raking angle can be easily changed. In one embodiment of the invention a first plate is attached to the beam and a second plate is attached to the vertical shaft. The two plates are both joined to a hinge barrel. Adjustment is accomplished with basic tools by moving an adjustment bolt to force the two plates apart to angle the beam and thus the rake wheels as desired.

The adjustment bolt is threaded into a threaded sleeve that is secured to one of the plates so that the adjustment bolt bears on the other plate. When the adjustment bolt is turned inward it bears against the other plate and forces the plates apart. Since both the plates are joined to the hinge barrel, forcing the plates apart also angles them relative to one another. The first plate carries the beam along with it, thus angling the beam relative to the carriage and the ground. The raking wheels are carried along with the beam and angled relative to the ground to increase the aggressiveness of the raking angle.

DETAILED DESCRIPTION OF THE INVENTION

Figure 1:
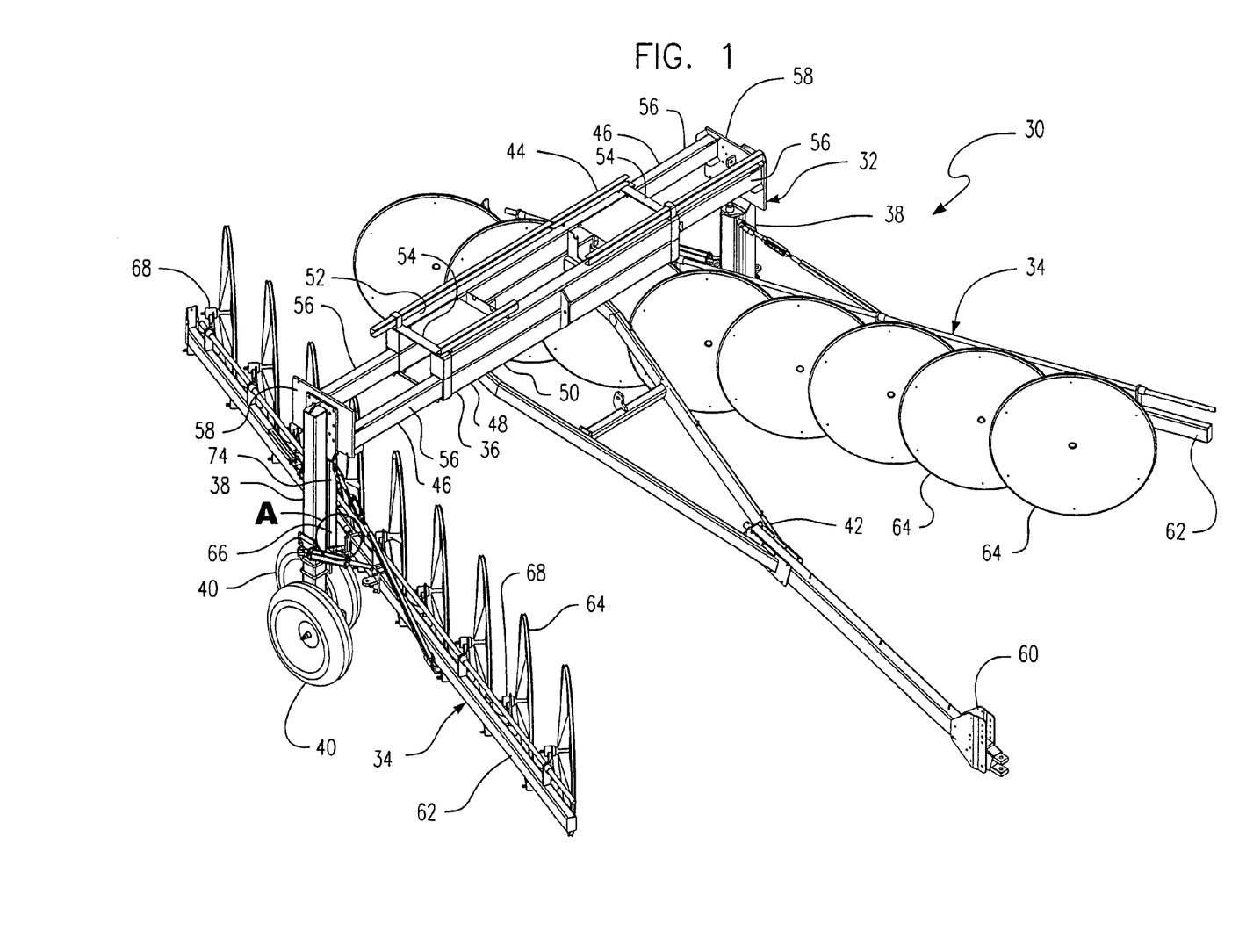
FIG. 1 is a perspective view of a wheel rake in accordance with the present invention with the raking angle adjusted to a less aggressive setting.
Figure 3:
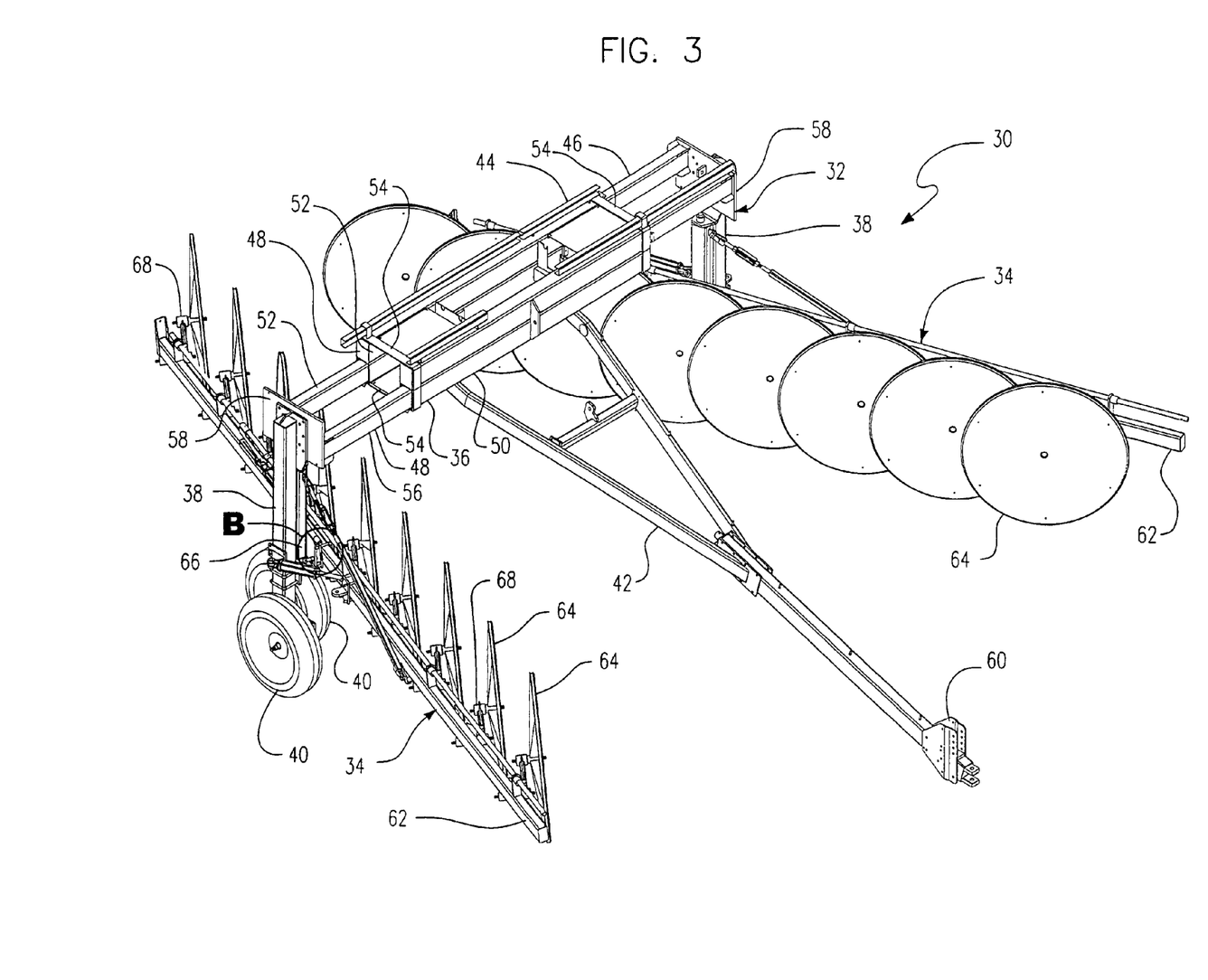
FIG. 3 is a perspective view of the wheel rake with the wheel angle set for more aggressive raking.
Figure 8:
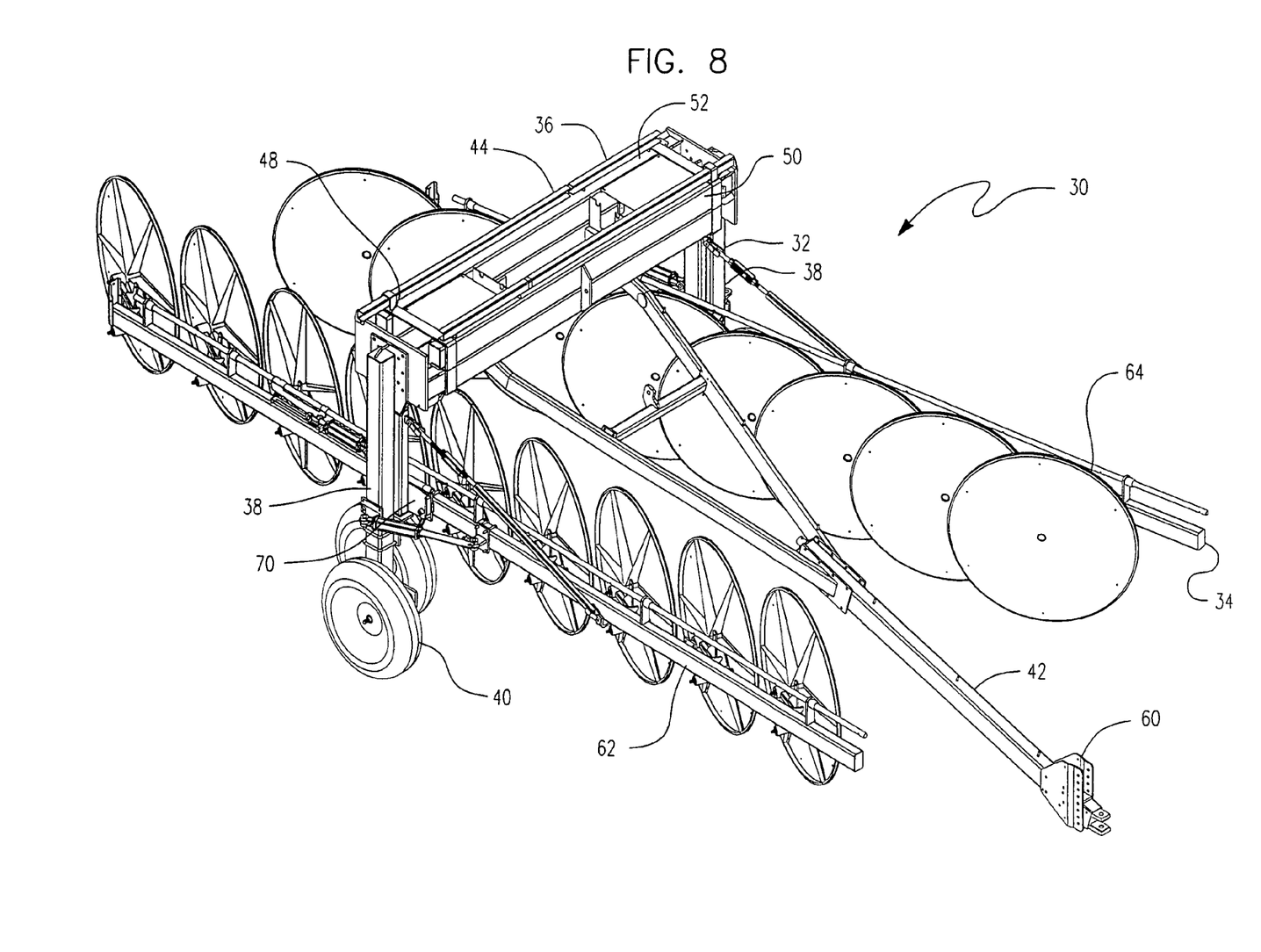
FIG. 8 is a perspective view of the wheel rake folded to a transport configuration.
Figure 9:
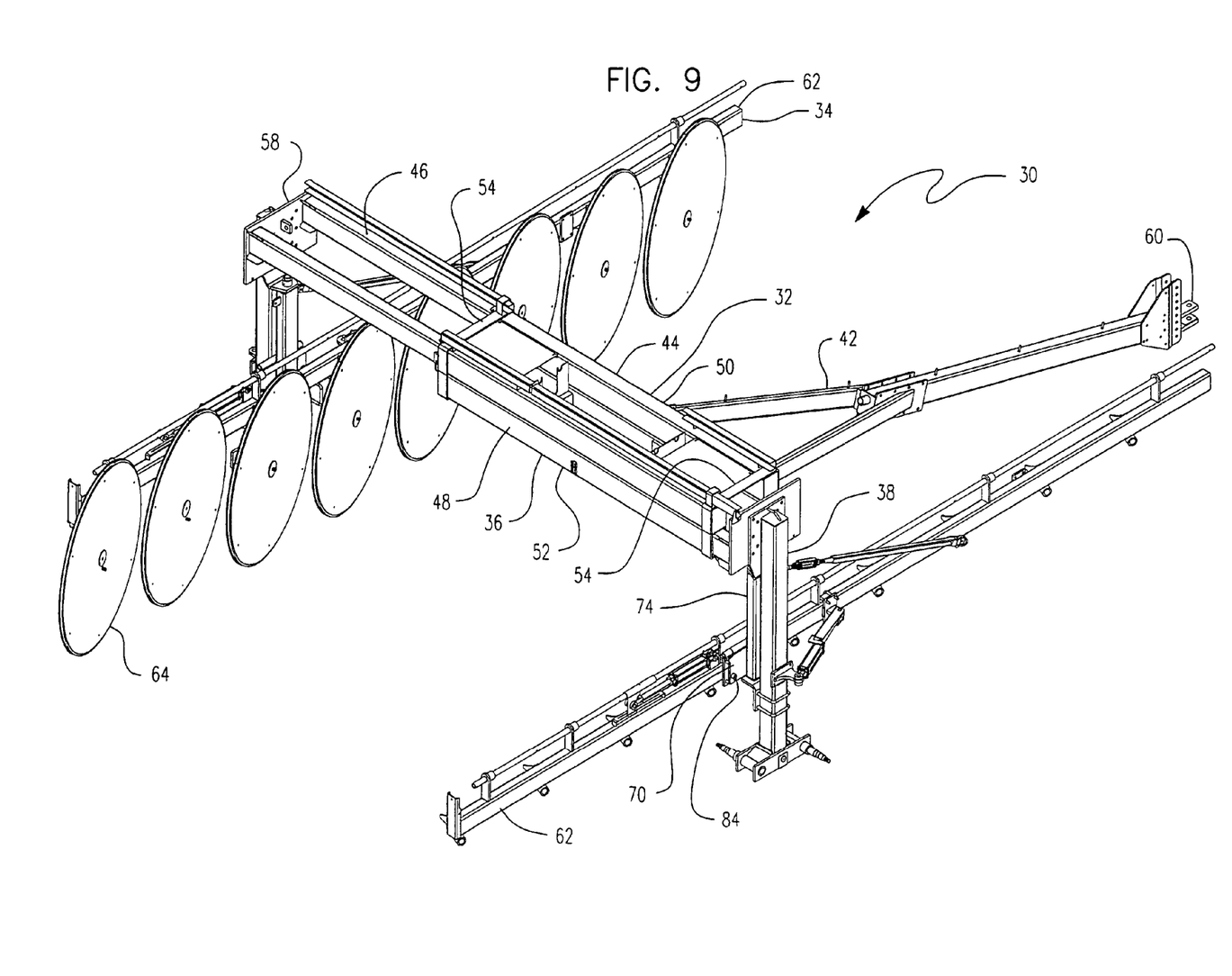
FIG. 9 is a perspective view of the wheel rake with certain parts removed for clarity.

Referring particularly to FIGS. 1, 3 and 8, wheel rake 30 generally includes carriage 32 and two rake assemblies 34. Rake assemblies 34 are generally mirror images of one another and are supported by carriage 32. Wheel rake 30 may also include one rake assembly 34 or more than two rake assemblies 34.

Carriage 32 generally includes cross frame 36, columns 38, wheels 40 and drawbar 42. Cross frame 36 generally includes central bridge 44 and sliders 46. Central bridge 44 is a robust structure desirably constructed of four parallel square tubes 48. Two square tubes 48 are stacked one on top of another in a front assembly 50 and two more square tubes are stacked one on top of the other in a rear assembly 52. Front assembly 50 and rear assembly 52 are interconnected and joined by cross braces 54. Sliders 46 telescopically slide within central bridge 44. Sliders 46 are desirably constructed of square tubes 56 that are sized to slidably fit within box channel 48. Each slider 46 terminates at a plate 58 at an outward end thereof. Sliders 46 are desirably operably connected to hydraulic rams (not shown).

Columns 38 are secured to the ends of sliders 46 at plate 58. Columns 38 support carriage 32 and are supported by wheels 40 at a bottom end thereof. Wheels 40 may be staggered as depicted in FIGS. 1 and 3. Wheels 40 can include more or less wheels than depicted here. Note that wheels 40 are closely spaced and support the entirety of wheel rake 30 reducing the likelihood of damage to rake assemblies 34 that arises when rake assemblies 34 are supported by wheels 40 at their ends and the end located wheels are caught by obstructions in the field.

Draw bar 42 is secured to central bridge 44, desirably, by pins. Draw bar 42 terminates at a front end thereof at hitch 60. Hitch 60 is adapted to be connected to a prime mover (not shown). The prime mover can include a tractor or a pickup truck. Thus, hitch 60 may be interchangeable to accommodate connection to a ball hitch, a pintle hook or other type of hitch. Hitch 60 may include an adjustment mechanism to adjust the height of the hitch 60 to accommodate differing hitch heights of varying prime movers.

Rake assembly 34 generally includes beam 62, rake wheels 64 and beam support 66. Beam 62 supports a plurality of rake wheels 64. Rake wheels 64 are each connected to beam by a trailing link 68. Trailing link 68 is pivotably connected to beam 62 to one end and to rake wheel 64 at the other. Rake wheels 64 are free to rotate at the end of trailing link 68 and further free to travel up and down along a limited arc of motion to follow ground contour. Trailing link 68 may be biased toward the ground so as to provide a resistive force to the tendency of rake wheels 64 to be pushed upward by irregularities in the terrain over which wheel rake 30 operates. Beam 62 is operably connected to column 38 by beam support 66.

Beam support 66 includes hinged angle adjuster 70 and clamp 72. Clamp 72 secures hinged angle adjuster 70 to beam 62. Clamp 72 may be a U-bolt or other clamping assembly. Additionally, beam 62 may be secured to beam support 66 in any way known to those skilled in the art.

Hinged angle adjuster 70 is also secured to column 38 via vertical shaft 74. Vertical shaft 74 is operably connected to column 38 so as to be pivotal about a vertical axis. Hinged angle adjuster 70 may be welded to vertical shaft 74 or attached by other suitable means.

Referring particularly to FIGS. 2 and 4-7, hinged angle adjuster 70 generally includes beam plate 76, vertical shaft plate 78 and hinge barrel 80. Beam plate 76 is secured to beam 62 preferably by U-bolts 82. Vertical shaft plate 78 is secured to vertical shaft 74, preferably by welding.

Figure 4:
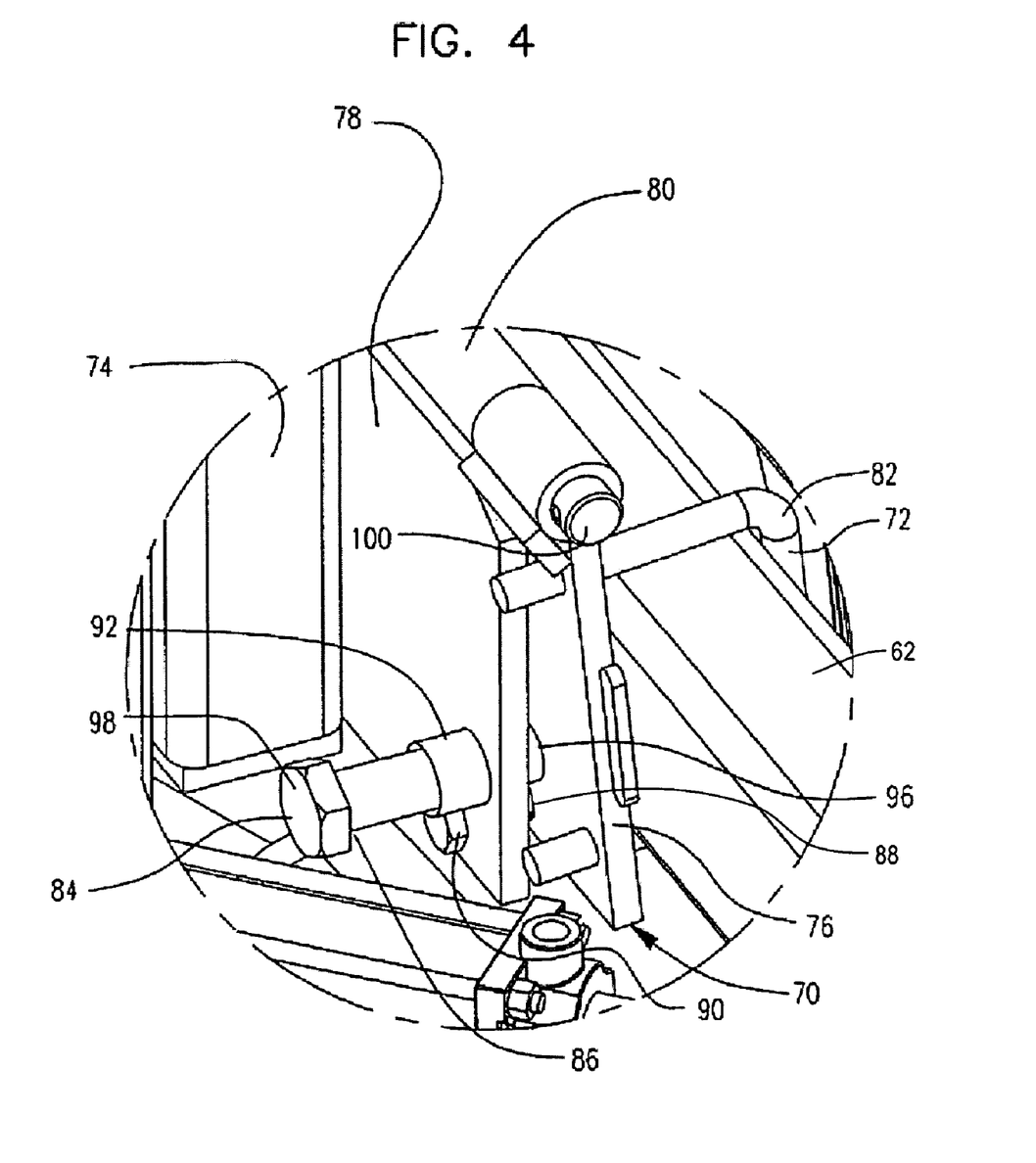
FIG. 4 is a detailed perspective view of the adjuster as taken from area B of FIG. 3.
Figure 5:
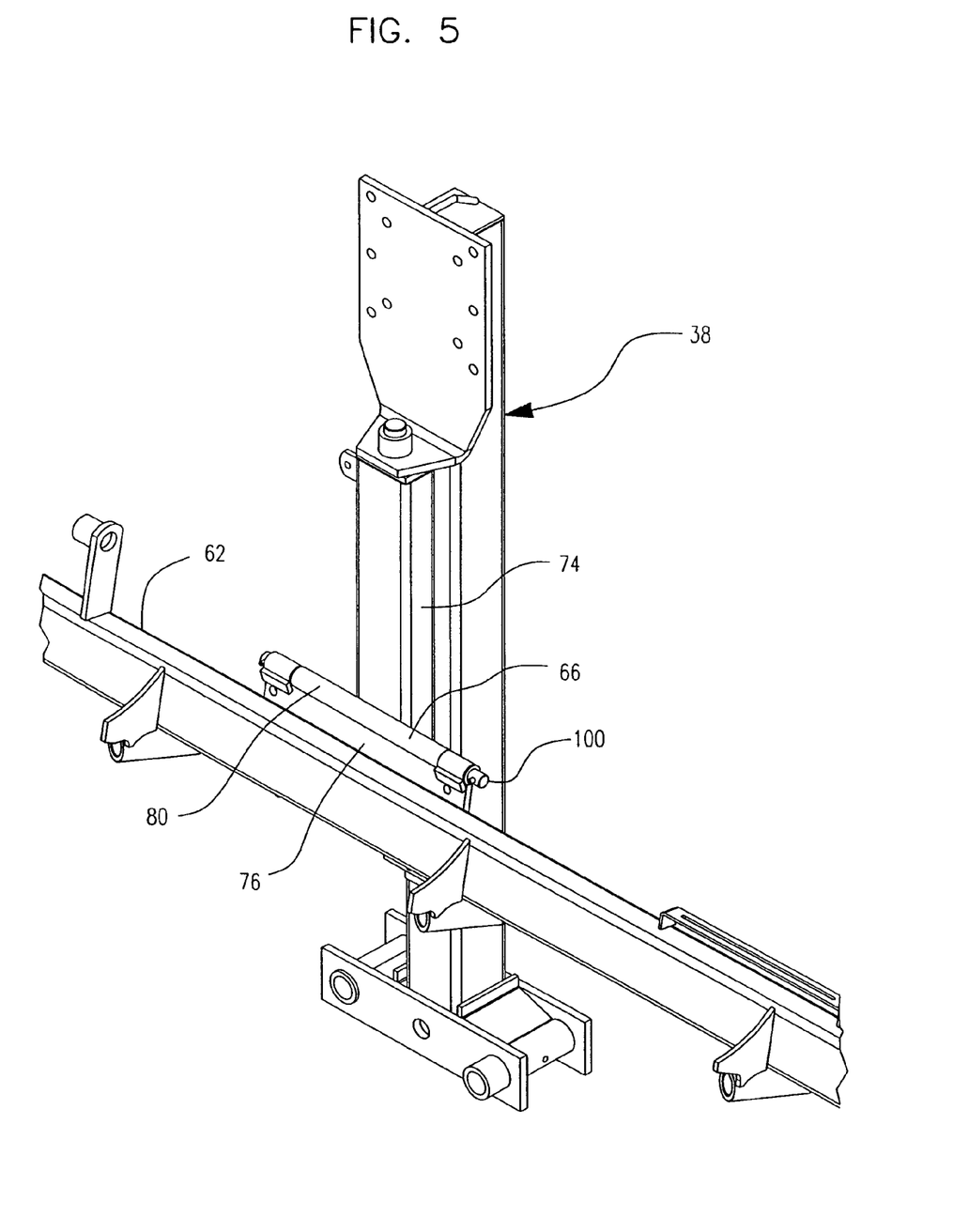
FIG. 5 is a perspective view of a hinge adjuster and support column in accordance with the present invention.
Figure 6:
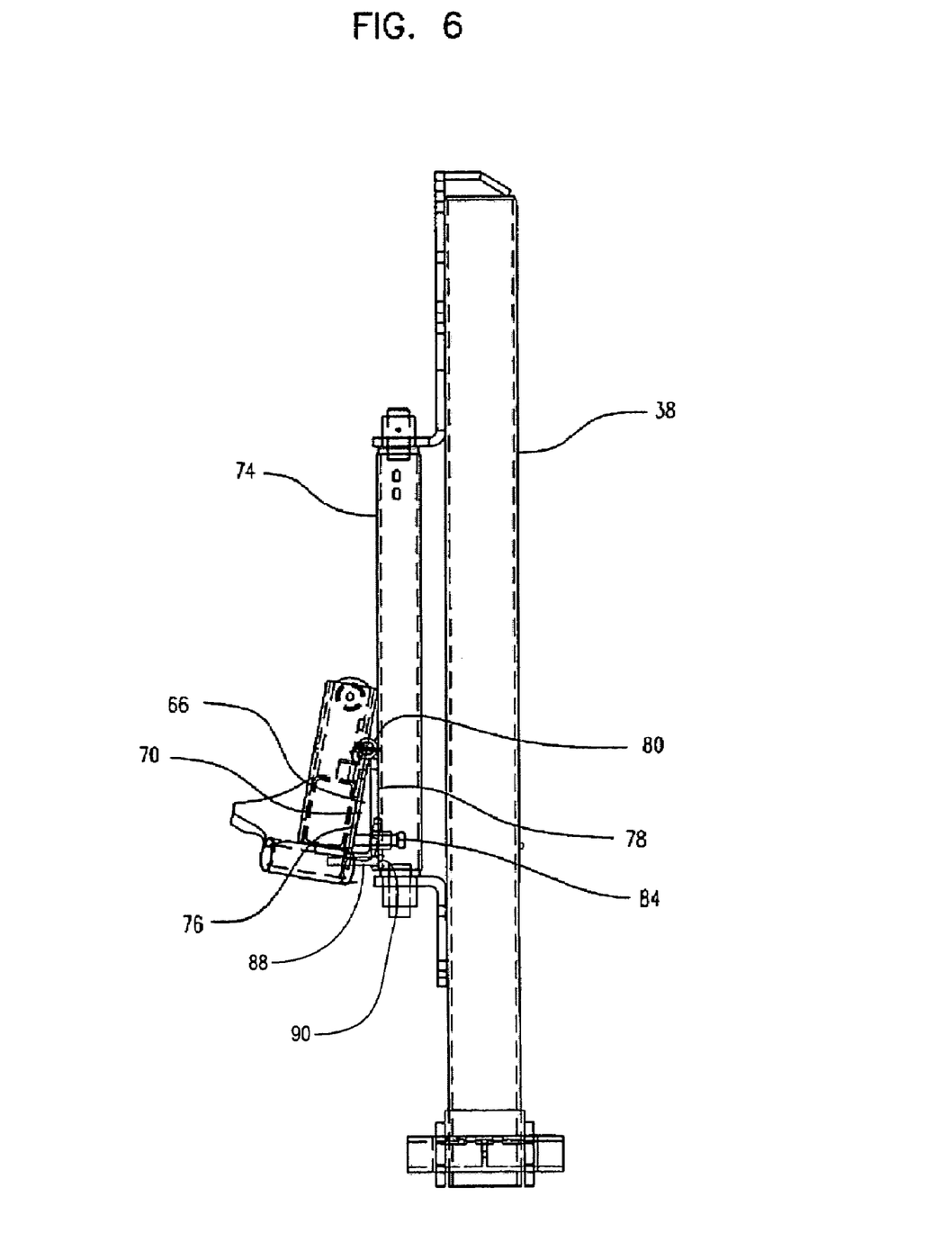
FIG. 6 is a front plan view of the hinge adjuster in accordance with the present invention.
Figure 7:
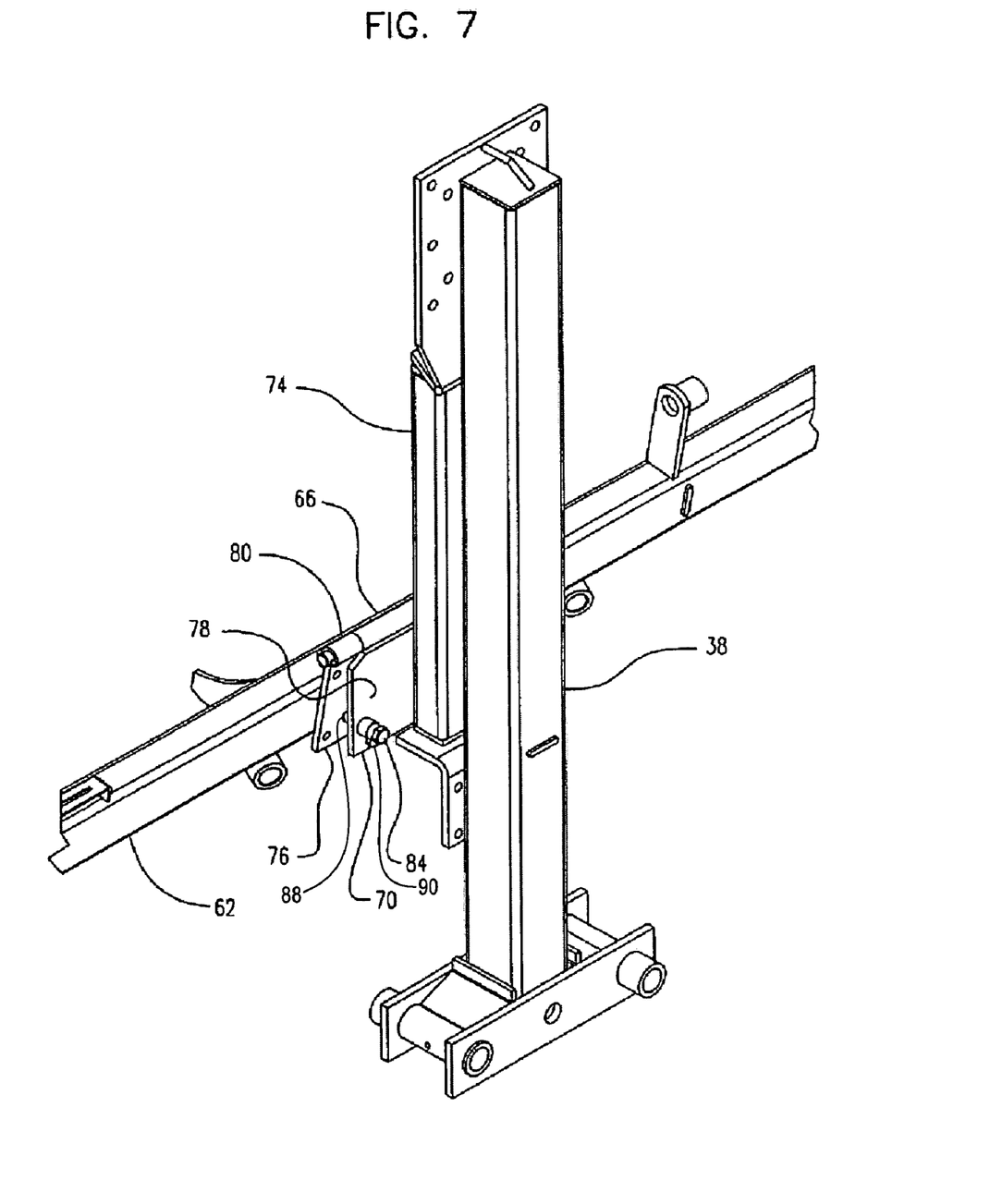
FIG. 7 is a rear perspective view of a hinge adjuster in accordance with the present invention.

Referring to FIGS. 4, 6 and 7, vertical shaft plate 78 supports adjuster 84. Adjuster 84 includes adjustment bolt 86, locking bolt 88 and locking nut 90. Adjuster 84 may also be structured another way to achieve the same angular adjustment qualities.

Referring to particularly to FIGS. 2, 4, 6 and 7, adjustment bolt 86 is supported in threaded collar 92. Threaded collar 92 is secured or integrally formed into vertical shaft plate 78. Locking bolt 88 passes through beam plate 76 and vertical shaft plate 78 via apertures (not shown). The head of locking bolt 88 may be secured to either vertical shaft plate 78 or beam plate 76. Thus, end 96 of adjustment bolt 86 bears against beam plate 76 and hex head 98 of adjustment bolt 86 protrudes through threaded collar 92. Locking bolt 88 passes through beam plate 76 and then through vertical shaft plate 78. Locking nut 90 bears against vertical shaft plate 78 when tightened. Other methods of constructing adjuster 84 will be apparent to one skilled in the art that would not depart from the spirit of the invention.

Beam plate 76 and vertical shaft plate 78 are each joined to hinge barrel 80. Hinge barrel 80 pivots about hinge pin 100. Hinge pin 100 has a long axis generally parallel to beam 62 and oriented generally horizontal relative to the ground.

Adjustment bolt 86, locking bolt 88 and locking nut 90 may be duplicated on vertical shaft plate 78. For example, one set of adjustment bolt 86, locking bolt 88 and locking nut 90 may be located on each side of vertical shaft 74.

Figure 2:
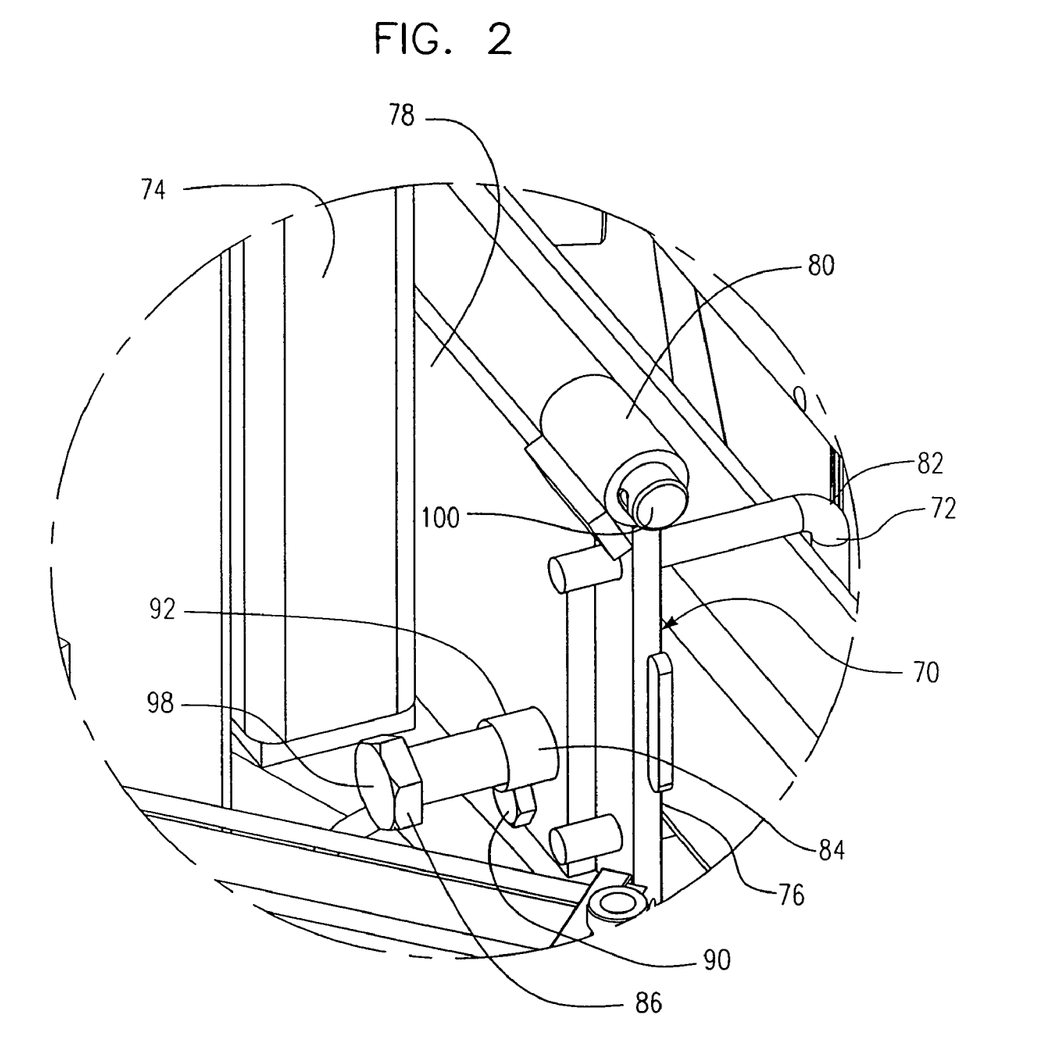
FIG. 2 is a detailed perspective view of an adjuster in accordance with the present invention taken from area A in FIG. 1.

In operation, raking angle may readily be adjusted. Referring to FIGS. 1-2, beam 62 is depicted in a straight vertical position. In this position, rake wheels 64 are less aggressively angled relative to the ground and appropriately positioned for raking normal forage from the ground.

Referring particularly to FIG. 2, with beam 62 in the straight position, adjustment bolts 86 is backed out of threaded collar 92 allowing beam plate 76 to lie flush against vertical shaft plate 78. Locking bolt 88 is pulled against beam plate 76 by tightening of locking nut 90. Adjustment bolt 86 may then be tightened to prevent its loss by backing out of threaded collar 92.

FIGS. 3, 4, and 6-7 depict rake wheels 64 more aggressively angled relative to the ground and appropriately positioned for raking heavy, wet or compacted forage from the ground.

Referring particularly to FIGS. 4, 6 and 7, when it is desired to move beam 62 to a more aggressive raking position, an operator first loosens locking nut 90 in order to create slack in locking bolt 88. The operator then turns adjustment bolt 86 inward to cause end 96 to bear against beam plate 76 thus rotating beam plate 76 about hinge pin 100 and creating a more aggressive raking angle for beam 62 and rake wheels 64. Once adjustment bolt 86 is adjusted to the desired point, the operator then may tighten locking nut 90 drawing locking bolt 88 against beam plate 76, thus drawing beam plate 76 toward vertical shaft plate 78 and locking adjustment bolt 86, thus securing beam 62 at an aggressive raking angle.

Figure 10A:
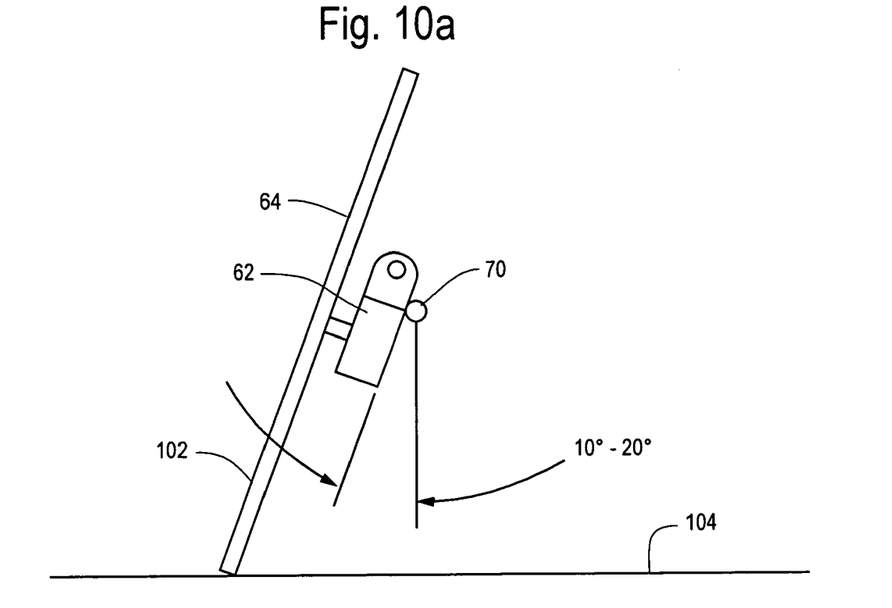
FIG. 10a is a schematic depiction of the relationship between a plane of the rake wheel and the ground with the rake wheel adjusted to a more aggressive angle.
Figure 10B:
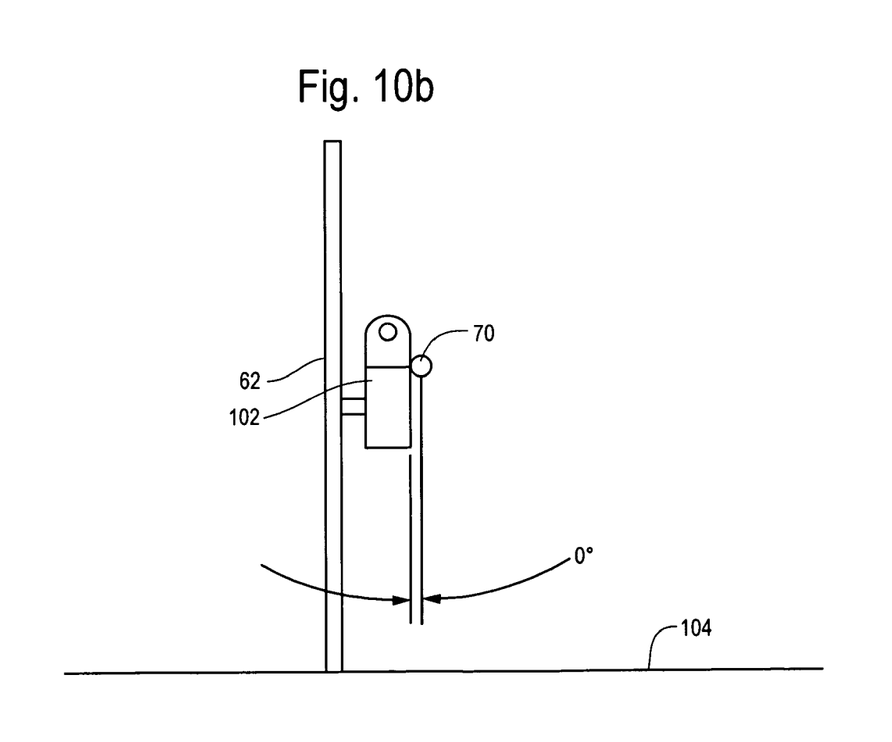
FIG. 10b is a schematic depiction of the relationship between a plane of the rake wheel and the ground with the rake wheel adjusted to a less aggressive angle.

Referring to FIGS. 10a and 10b, rake wheel 64, beam 62 and hinge angle adjuster 70 are schematically depicted. In FIG. 10b plane 102 of rake wheel 64 is substantially perpendicular to ground 104. Hinge angle adjuster 70 is in the position depicted in FIGS. 1 and 2.

In FIG. 10a, in one embodiment of the invention, plane 102 of rake wheel 64 is at an angle of ten to twenty degrees from vertical and hinge angle adjuster 70 is in a position like that depicted in FIGS. 3 and 4. Thus, the raking angle is adjusted to a more aggressive posture. The hinge angle adjuster 70 travel may be limited to a selected angular value.

For example, in one aspect of the invention, the hinge angle adjuster 70 travel may be limited to ten degrees or twenty degrees.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A wheel rake, comprising:
    a carriage supported by ground engaging wheels;
    a beam supported by the carriage, the beam having a long axis and operably supporting a plurality of rake wheels along its length, the beam being shiftable between a transport position and a working position and the rake wheels being further operably supported by a vertical shaft pivotable around a vertical axis, each of the rake wheels being rotatably supported on an axle and defining a plane normal to the axle; and
    the rake wheels also being operably supported by a horizontal shaft pivotable around a horizontal axis oriented parallel to the long axis of the beam when the beam is in the working position, whereby an angular relationship between a ground plane and the wheel defined plane is substantially continuously adjustable and fixable at a desired angular relationship.

2. The wheel rake as claimed in claim 1, further comprising an adjuster whereby the raking wheels are rotated about the horizontal axis whereby the angle between the ground and a plane of the rake wheels is adjustable.

3. The wheel rake as claimed in claim 2, in which the adjuster is lockable.

4. The wheel rake as claimed in claim 2, the adjuster further comprising an adjusting bolt whereby the adjuster is rotated about the horizontal axis by turning the adjusting bolt.

5. The wheel rake as claimed in claim 2, the adjuster further comprising an adjusting bolt and a locking bolt.

6. The wheel rake as claimed in claim 1, in which the pivoting of the beam about the horizontal shaft is limited to about twenty degrees.

7. The wheel rake as claimed in claim 1, in which the pivoting of the beam about the horizontal shaft is limited to about ten degrees.

8. The wheel rake as claimed in claim 1, in which the pivoting of the means for supporting about the horizontal axis is limited to less than about twenty degrees.

9. The wheel rake as claimed in claim 1, in which the pivoting of the means for supporting about the horizontal axis is limited to less than about ten degrees.

10. A wheel rake, comprising:
    a carriage having ground engaging wheels;
    elongate means for supporting a plurality of rake wheels in a liner relation supported by the carriage, the elongate means for supporting the plurality of rake wheels being pivotable around a horizontal axis and a vertical axis, the rake wheels each being further rotatably supported on an axle and defining a plane normal to the axle;
    wherein the elongate means for supporting the plurality of rake wheels has a long axis and is shiftable from a folded transport position to an extended working position; and
    the horizontal axis being maintained parallel to the long axis of the elongate means in the extended working position whereby an angular relationship between the ground and the plane is adjustable by movement of the elongate means for supporting a plurality of rake wheels about the horizontal axis.

11. The wheel rake as claimed in claim 10, further comprising means for adjusting the angular relationship whereby the raking wheels are rotated about the horizontal axis.

12. The wheel rake as claimed in claim 10, further comprising adjusting means and in which the adjusting means is lockable.

13. The wheel rake as claimed in claim 12, the adjusting means further comprising an adjusting bolt whereby the adjusting means is rotated about the horizontal axis by turning the adjusting bolt.

14. The wheel rake as claimed in claim 12, the adjusting means further comprising an adjusting bolt and a locking bolt.

15. A method of changing the angular relationship between the rake wheels of a wheel rake and the ground over which the rake wheels are drawn comprising the steps of:
supporting a beam supporting the rake wheels from a carriage supported by ground engaging wheels, the beam having a long axis;
pivotably rotating the beam and thus the rake wheels about a horizontal axis tat is parallel to the long axis of the beam;
shifting the beam between a folded transport position and an extended working position;
maintaining the horizontal axis parallel to the long axis of the beam in the extended working position; and
selectably fixing the beam at a desired angular position about the horizontal axis.

16. The method as claimed in claim 15, further comprising the step of interposing an adjuster between the beam and the carriage.

17. The method as claimed in claim 16, further comprising the step of locking the adjuster in a desired position.

18. The method as claimed in claim 16, further comprising the step of locking the adjuster by use of an adjusting bolt whereby the adjuster is rotated about the horizontal axis by turning the adjusting bolt.

19. The method as claimed in claim 15, further comprising the step of limiting the rotation of the beam about the horizontal axis to less than about twenty degrees. rotation of the beam about the horizontal axis to less than about twenty degrees.

20. The method as claimed in claim 15, further ocmprising the step of limiting the rotation of the beam about the horizontal axis to less than about ten degrees.

* * * * *